United States Patent
Funazukuri

(10) Patent No.: US 12,524,197 B2
(45) Date of Patent: Jan. 13, 2026

(54) INFORMATION PROCESSING APPARATUS FOR CONTROLLING SOUND GENERATED IN VICINITY OF PEDESTRIAN AND FOR TRANSMITTING INSTRUCTION SIGNAL TO INSTRUCT MOBILE OBJECT TO SWITCH OPERATION MODE

(71) Applicant: TOYOTA JIDOSHA KABUSHIKI KAISHA, Toyota (JP)

(72) Inventor: Mina Funazukuri, Sumida-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 195 days.

(21) Appl. No.: 18/397,500

(22) Filed: Dec. 27, 2023

(65) Prior Publication Data

US 2024/0220188 A1 Jul. 4, 2024

(30) Foreign Application Priority Data

Dec. 28, 2022 (JP) ................................. 2022-212665

(51) Int. Cl.
*G06F 3/16* (2006.01)
*G08G 1/005* (2006.01)
*G08G 1/01* (2006.01)

(52) U.S. Cl.
CPC ............. *G06F 3/165* (2013.01); *G08G 1/005* (2013.01); *G08G 1/01* (2013.01)

(58) Field of Classification Search
CPC ........... G06F 3/165; G08G 1/005; G08G 1/01
See application file for complete search history.

(56) References Cited

U.S. PATENT DOCUMENTS

2011/0234422 A1  9/2011  Yamashita
2018/0286231 A1* 10/2018 Muro-Calderon ...... H04W 4/48

FOREIGN PATENT DOCUMENTS

| JP | 2000-211402 A | 8/2000 |
| JP | 2006-215970 A | 8/2006 |
| JP | 2011-168130 A | 9/2011 |
| JP | 2011-198295 A | 10/2011 |
| JP | 2014-048732 A | 3/2014 |

* cited by examiner

*Primary Examiner* — Joseph Saunders, Jr.
(74) *Attorney, Agent, or Firm* — Finnegan, Henderson, Farabow, Garrett, and Dunner, LLP

(57) ABSTRACT

An information processing apparatus includes a controller. The controller is configured to identify a device that generates sound within a surrounding area of a pedestrian upon detecting a first mobile object traveling in a vicinity of the pedestrian, and control the sound generated from the identified device to be reduced.

2 Claims, 3 Drawing Sheets

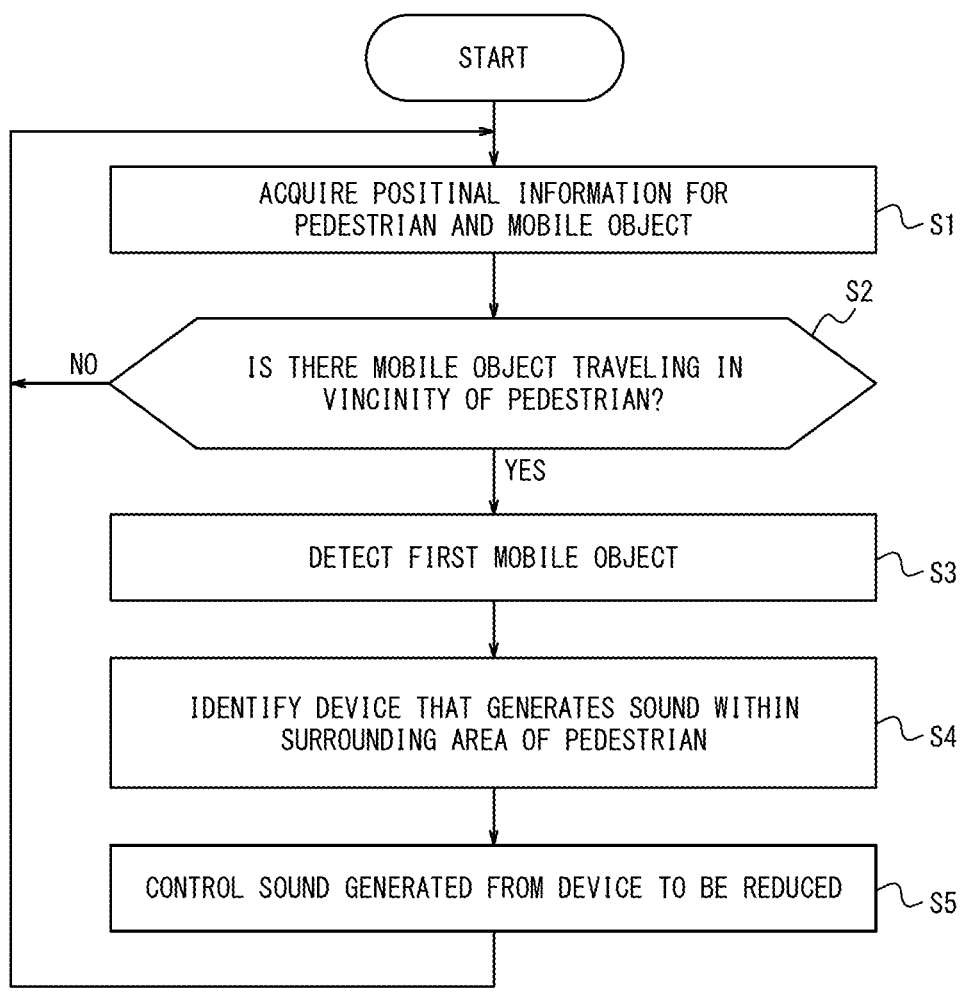

INFORMATION PROCESSING APPARATUS FOR CONTROLLING SOUND GENERATED IN VICINITY OF PEDESTRIAN AND FOR TRANSMITTING INSTRUCTION SIGNAL TO INSTRUCT MOBILE OBJECT TO SWITCH OPERATION MODE

CROSS-REFERENCE TO RELATED APPLICATION

This application claims priority to Japanese Patent Application No. 2022-212665 filed on Dec. 28, 2022, the entire contents of which are incorporated herein by reference.

TECHNICAL FIELD

The present disclosure relates to an information processing apparatus.

BACKGROUND

Technology for making a pedestrian aware of approach of a mobile object is known. For example, Patent Literature (PTL) 1 describes a vehicle approach notification system that makes notification of approach of a vehicle when it is determined that notification of the approach of the vehicle is needed.

CITATION LIST

Patent Literature

PTL 1: JP 2011-198295 A

SUMMARY

Conventional technology for making a pedestrian aware of approach of a mobile object has room for improvement. For example, a pedestrian may not be aware of approach of a mobile object due to ambient noise.

It would be helpful to provide improved technology for making a pedestrian aware of approach of a mobile object.

An information processing apparatus according to an embodiment of the present disclosure includes a controller. The controller is configured to:
  identify a device that generates sound within a surrounding area of a pedestrian upon detecting a first mobile object traveling in a vicinity of the pedestrian; and
  control the sound generated from the identified device to be reduced.

According to an embodiment of the present disclosure, improved technology for making a pedestrian aware of approach of a mobile object can be provided.

BRIEF DESCRIPTION OF THE DRAWINGS

In the accompanying drawings:

FIG. 3 is a flowchart illustrating an example procedure for an information processing method according to an embodiment of the present disclosure.

DETAILED DESCRIPTION

An embodiment of the present disclosure will be described below, with reference to the drawings.

(Configuration of System)

Figure 1:
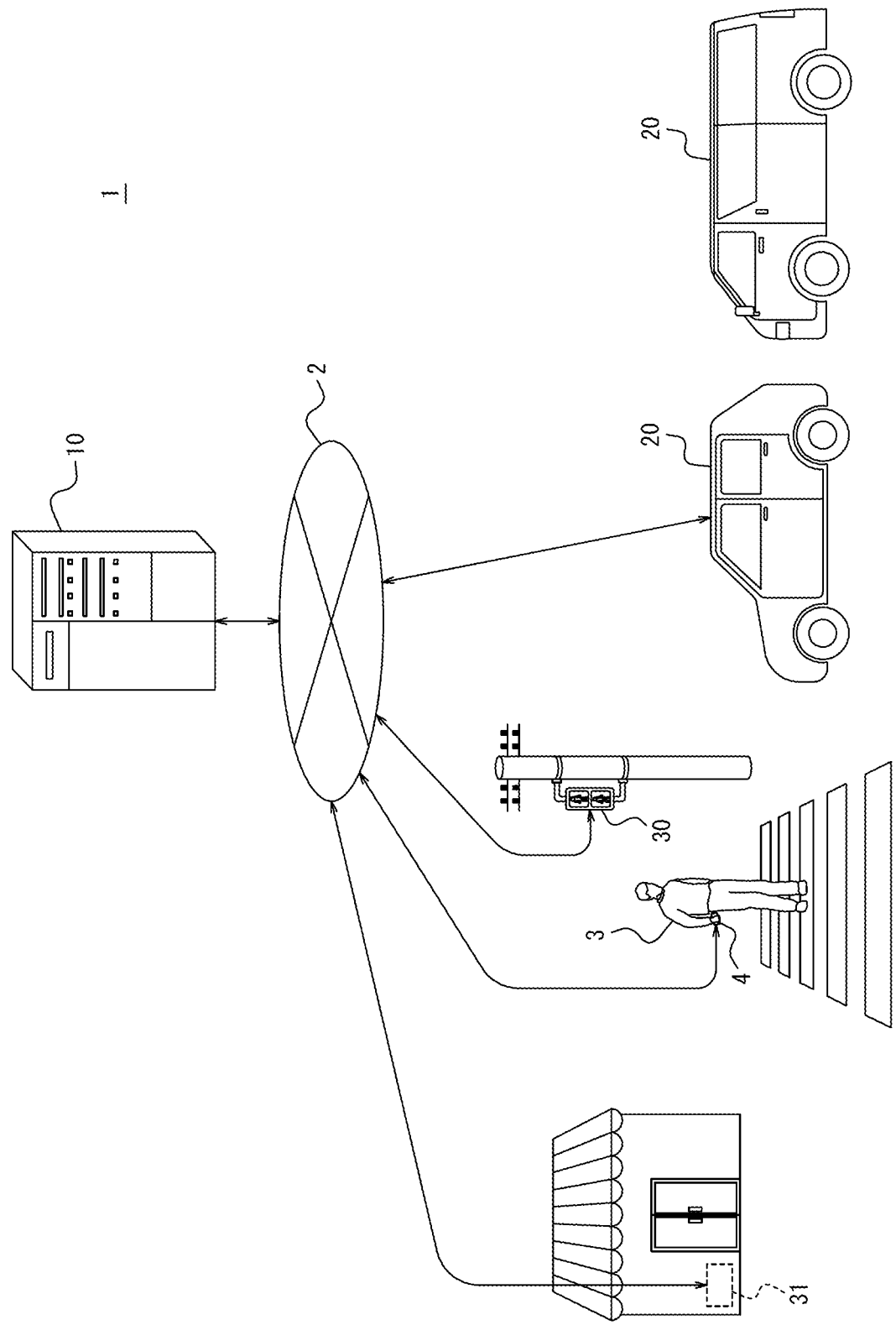
FIG. 1 is a diagram illustrating a schematic configuration of a system according to an embodiment of the present disclosure.

As illustrated in FIG. 1, a system 1 includes an information processing apparatus 10, a plurality of mobile objects 20, a traffic signal 30, and a sound device 31. However, the system 1 does not have to include the traffic signal 30 and the sound device 31. The system 1 should also include at least one mobile object 20.

The network 2 may be any network including a mobile communication network, the Internet, or the like. The information processing apparatus 10 can communicate with the mobile objects 20, the traffic signal 30, and the sound device 31 via the network 2.

A pedestrian 3 walks on sidewalks or crosses streets such as intersections. The pedestrian 3 may hold an electronic device 4. The electronic device 4 is, for example, a smartphone or a wearable device. The electronic device 4 may transmit the positional information for the pedestrian 3 to the information processing apparatus 10 via the network 2 at preset time intervals. The time intervals may be set based on a walking speed of the pedestrian 3 or the like.

The information processing apparatus 10 can detect the first mobile object. The first mobile object is a mobile object 20 traveling in the vicinity of the pedestrian 3. The information processing apparatus 10 identifies a device that generates sound within the surrounding area of the pedestrian 3 upon detecting the first mobile object and controls the sound generated from the identified device to be reduced. This configuration makes it easier for the pedestrians 3 to notice sounds such as running noises emitted by the first mobile object. As a result, it is easier for the pedestrian 3 to notice the presence of the first mobile object traveling in his/her vicinity.

The information processing apparatus 10 is, for example, a dedicated computer configured to function as a server, a general purpose personal computer, a cloud computing system, or the like.

The mobile objects 20 may be any object that can travel on a roadway or a sidewalk. The mobile objects 20 are, for example, vehicles or robots. The mobile objects 20 may be operated for any purpose. For example, the mobile objects 20 may be transport vehicles that carry goods to a destination by a specified time, or they may be advertising vehicles. The mobile objects 20 may be operated as dedicated Mobility as a Service (MaaS) vehicles.

In the present embodiment, the mobile objects 20 drive autonomously. The mobile objects 20 may, however, be driven by drivers. In the present embodiment, the mobile objects 20 are powered by electric power.

The mobile objects 20 have a first mode and a second mode as operation modes. The first mode is an operation mode in which the vehicle runs autonomously. The second mode is an operation mode in which the sound generated by the device during autonomous driving is reduced compared to the first mode. The mobile objects 20 are capable of switching between the first and second modes.

The traffic signal 30 is an acoustic traffic signal. For example, the traffic signal 30 outputs an inductive sound while the blue light is on. The traffic signal 30 has a communication function.

The sound device 31 is installed in a store. The sound device 31 has communication capabilities. The sound device 31 outputs sound, for example, to the outside or inside of the store. The sound device 31 actively outputs the sound. In the present embodiment, actively outputting sound does not mean outputting naturally occurring sound, but rather outputting sound based on control signals, etc. The sound output by the sound device 31 may be, for example, voice or music for store advertisements or background music (BGM).

(Configuration of Information Processing Apparatus)

Figure 2:
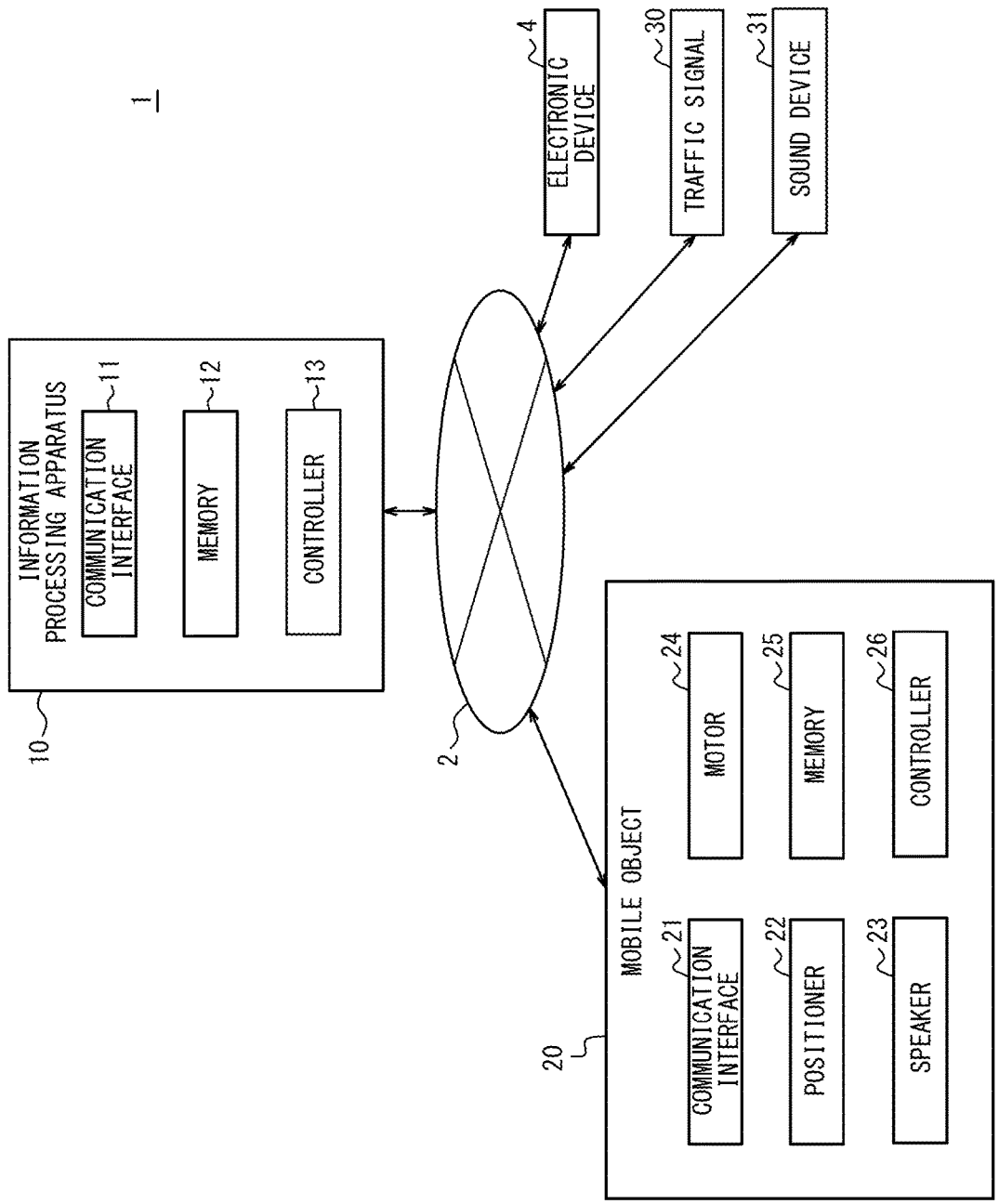
FIG. 2 is a block diagram of the system illustrated in FIG. 1.

As illustrated in FIG. 2, the information processing apparatus 10 includes a communication interface 11, a memory 12, and a controller 13.

The communication interface 11 is configured to include at least one communication module for connection to the network 2. For example, the communication module is a communication module compliant with a standard such as a wired Local Area Network (LAN) or a wireless LAN. The communication interface 11 is connectable to the network 2 via a wired LAN or a wireless LAN using the communication module.

The memory 12 is configured to include at least one semiconductor memory, at least one magnetic memory, at least one optical memory, or a combination of at least two of these. The memory 12 may function as a main memory, an auxiliary memory, or a cache memory. The memory 12 stores data to be used in the operations of the information processing apparatus 10 and data obtained by the operations of the information processing apparatus 10. For example, the positional information for the traffic signal 30 and the positional information for the store where the sound device 31 is installed are stored in the memory 12.

The controller 13 is configured to include at least one processor, at least one dedicated circuit, or a combination thereof. The processor is, for example, a general purpose processor such as a Central Processing Unit (CPU) or a Graphics Processing Unit (GPU), or a dedicated processor that is dedicated to a specific process. The controller 13 executes processes related to the operations of the information processing apparatus 10 while controlling the components of the information processing apparatus 10.

(Configuration of Mobile Object)

As illustrated in FIG. 2, each mobile object 20 includes a communication interface 21, a positioner 22, a speaker 23, a motor 24, a memory 25, and a controller 26.

The communication interface 21 is configured to include at least one communication module for connection to the network 2. The communication module is a communication module compliant with a mobile communication standard such as Long Term Evolution (LTE), 4th Generation (4G), or 5th Generation (5G).

The positioner 22 is capable of acquiring the positional information for the mobile object 20. The positioner 22 is configured to include at least one receiving module compliant with a satellite positioning system. The receiving module is, for example, a receiving module corresponding to the Global Positioning System (GPS).

The speaker 23 can output sound, for example, to the outside of mobile object 20. The speaker 23 actively outputs the sound. The sound output by the speaker 23 is, for example, an advertising voice or music if the mobile object 20 is an advertising vehicle. The sound output by the speaker 23 may be an alarm sound.

The motor 24 is the drive motor for driving the mobile object 20. The motor 24 converts electric power into motive power.

The memory 25 is configured to include at least one semiconductor memory, at least one magnetic memory, at least one optical memory, or a combination of at least two of these. The memory 25 may function as, for example, a main memory, an auxiliary memory, or a cache memory. The memory 25 stores data to be used for the operations of the mobile object 20 and data obtained by the operations of the mobile object 20. For example, the memory 25 stores data on the weight of the mobile object 20 and the dimensions of the mobile object 20's outer shape.

The controller 26 is configured to include at least one processor, at least one dedicated circuit, or a combination thereof. The processor is, for example, a general purpose processor such as a CPU or a GPU, or a dedicated processor that is dedicated to a specific process. The controller 26 executes processes related to the operations of the mobile object 20 while controlling components of the mobile object 20.

While the mobile object 20 is traveling, the controller 26 acquires positional information for the mobile object 20 using the positioner 22. The controller 26 controls the communication interface 21 to transmit the acquired positional information for the mobile object 20 to the information processing apparatus 10 via the network 2. The controller 26 may acquire, at established time intervals, the positional information for the mobile object 20 and transmit the positional information for the mobile object 20 to the information processing apparatus 10. The time intervals may be set based on an average speed or the like of the mobile object 20. The controller 26 may transmit the data of the weight of the mobile object 20 stored in the memory 25, along with the positional information for the mobile object 20, to the information processing apparatus 10. The controller 26 may transmit to the information processing apparatus 10 the data on the dimensions of the outer shape of the mobile object 20 stored in the memory 25, along with the positional information for the mobile object 20.

(Operations of System)

FIG. 3 is a flowchart illustrating an example procedure for an information processing method according to an embodiment of the present disclosure. The controller 13 may initiate the process of step S1 at any timing.

In step S1, the controller 13 obtains the positional information for the pedestrian 3 and the mobile object 20. The controller 13 receives the positional information for the pedestrian 3 from the electronic device 4 via the network 2 by the communication interface 11. The controller 13 receives the positional information for the mobile object 20 from the mobile object 20 via the network 2 by the communication interface 11. As another example, the controller 13 may obtain the positional information for the pedestrian 3 and the mobile object 20 by receiving the positional information for the pedestrian 3 and the mobile object 20 from a roadside machine or other device via the network 2 by the communication interface 11.

In step S2, the controller 13 determines whether or not there is a mobile object 20 traveling in the vicinity of the pedestrian 3 based on the positional information for the pedestrian 3 and the mobile object 20. For example, the controller 13 determines that there is a mobile object 20 traveling in the vicinity of the pedestrian 3 when the mobile object 20 is within a predetermined set range from the position of the pedestrian 3. The setting range may be set by considering the distance between the pedestrian 3 and the mobile object 20, which increases the likelihood of contact between the pedestrian 3 and the mobile object 20.

When the controller 13 has determined that there is a mobile object 20 traveling in the vicinity of the pedestrian 3 (step S2: YES), the controller 13 proceeds to the processing of step S3. On the other hand, if the controller 13 determines that there is no mobile object 20 traveling in the vicinity of the pedestrian 3 (step S2: NO), it returns to the process of step S1.

In the process of step S3, the controller 13 detects the mobile object 20 traveling in the vicinity of the pedestrian 3 as the first mobile object.

Here, in the process of step S3, the controller 13 may detect the mobile object 20 traveling in the vicinity of the pedestrian 3 and satisfying the predetermined conditions as the first mobile object. The controller 13 may not detect the mobile object 20 traveling in the vicinity of the pedestrian 3 as the first mobile object if the mobile object 20 traveling in the vicinity of the pedestrian 3 does not meet the predetermined conditions. If the controller 13 does not detect the first mobile object, it does not proceed to step S4 but returns to step S1.

The predetermined condition may be that the mobile object 20 is likely to injure the pedestrian 3 if it comes into contact with the pedestrian 3.

As an example of the above, a predetermined condition may be a condition with the mobile object 20 whose weight is above the weight threshold. The weight threshold may be set based on the assumed weight of the mobile object 20 that is likely to cause injury to the pedestrian 3 in the event of contact with the pedestrian 3. The controller 13 may receive data on the weight of the mobile object 20 along with the positional information for the mobile object 20 from the mobile object 20 in step S1. Here, when the weight of the mobile object 20 is less than the weight threshold, the likelihood of the pedestrian 3 being injured when the mobile object 20 contacts the pedestrian 3 is less than when the weight of the mobile object 20 is greater than the weight threshold. By setting the predetermined conditions in this way, the controller 13 can avoid detecting a mobile object 20 whose weight is less than the weight threshold as the first mobile object, even if it is a mobile object 20 traveling in the vicinity of the pedestrian 3. On the other hand, the controller 13 can detect a mobile object 20 that is traveling in the vicinity of the pedestrian 3 and whose weight is above the weight threshold as the first mobile object.

As another example of the above, the predetermined condition may be a condition with the mobile objects 20 whose external dimensions are greater than or equal to the dimensional threshold. The dimensional threshold may be set based on the assumed dimensions of the exterior of the mobile object 20 that are likely to cause injury to the pedestrian 3 in the event of contact with the pedestrian 3. The controller 13 may receive data on the dimensions of the outer shape of the mobile object 20 along with the positional information for the mobile object 20 from the mobile object 20 in the process of step S1. Here, when the mobile object 20 is a small vehicle or the like, the likelihood that the pedestrian 3 will be injured when the mobile object 20 contacts the pedestrian 3 is lower than when the mobile object 20 is a large vehicle or the like. By setting the predetermined conditions in this way, the controller 13 can avoid detecting a mobile object 20 that travels in the vicinity of the pedestrian 3 and whose external dimensions are less than the dimensional threshold as the first mobile object. On the other hand, the controller 13 can detect a mobile object 20 that is traveling in the vicinity of the pedestrian 3 and whose external dimensions are greater than the dimensional threshold as the first mobile object.

The predetermined condition may be that the pedestrian 3 is walking on a sidewalk and the mobile object 20 is traveling on the sidewalk. The controller 13 may determine whether the pedestrian 3 is walking on the sidewalk based on the positional information for the pedestrian 3. The controller 13 may also determine whether the mobile object 20 is traveling on a sidewalk based on the positional information for the mobile object 20. Here, some mobile object, for example, small unmanned vehicles, travel on the sidewalks. If the pedestrian 3 is walking on the sidewalk, the likelihood of a mobile object 20 traveling on the sidewalk coming into contact with the pedestrian 3 is higher than the likelihood of contact between the mobile object 20 traveling on the roadway and the pedestrian 3. By setting the predetermined conditions in this way, the controller 13 can detect the mobile object 20 traveling on the sidewalk as the first mobile object when the pedestrian 3 is walking on the sidewalk. On the other hand, the controller 13 can avoid detecting the mobile object 20 traveling on the roadway as the first mobile object when the pedestrian 3 is walking on the sidewalk.

The predetermined condition may be that the pedestrian 3 is about to cross the roadway, and that the pedestrian 3 is a mobile object 20 traveling on the roadway. The controller 13 may determine whether the pedestrian 3 is about to cross the roadway based on the positional information for the pedestrian 3. The controller 13 may also determine whether the mobile object 20 is traveling on a roadway based on the positional information for the mobile object 20. Here, the mobile object is, for example, a general-purpose automobile, which travels on a roadway. Some mobile object, such as robots, also travel on roadways in the same manner as ordinary automobiles. Furthermore, if the pedestrian 3 is crossing a roadway, the likelihood that the mobile object 20 traveling on the roadway will contact the pedestrian 3 is greater than the likelihood that mobile object traveling on the sidewalk will contact the pedestrian 3. By setting the predetermined conditions in this way, the controller 13 can detect the mobile object 20 traveling on the roadway as the first mobile object when the pedestrian 3 is crossing the roadway. On the other hand, the controller 13 can avoid detecting the mobile object 20 traveling on the sidewalk as the first mobile object when the pedestrian 3 is crossing the roadway.

In the process of step S4, the controller 13 identifies devices that generate sound within the surrounding area of the pedestrian 3. The range of the surrounding area may be set by taking into account the volume of the running sound and other sounds generated by the first mobile object.

For example, the controller 13 may identify the traffic signal 30 as the device that generates the sound, based on the positional information for the pedestrian 3 and the positional information for the traffic signal 30 in the memory 12. The controller 13 may also identify the sound devices 31 installed in the store based on the positional information for the pedestrian 3 and the positional information for the store in the memory 12 as devices that generate sound.

For example, the controller 13 may identify a second mobile object different from the first mobile object from among the plurality of mobile object 20 based on the positional information for the pedestrian 3 and the plurality of mobile object 20 as the device generating the sound. The sound generated by the second mobile object is, for example, rotating sound of the motor 24 or the sound output from the speaker 23.

In the process of step S5, the controller 13 controls the sound generated by the equipment identified in the process of step S4 to be reduced.

For example, if the controller 13 identifies the traffic signal 30 as a device that generates sound, it generates a control signal to reduce the volume of the inductive sound of the traffic signal 30 to a set value, for example. This setting value may be set within a range that does not impair the convenience of visually impaired persons, etc. The controller 13 transmits, through the communication interface 11, the generated control signal to the traffic signal 30 via the network 2. When the traffic signal 30 receives a control signal from the information processing apparatus 10 via the network 2, it lowers the volume of the inductive sound according to the received control signal.

For example, if the controller 13 identifies the sound device 31 as a device that generates sound, it generates a control signal to, for example, lower the volume of the sound device 31 to a set value or to zero, or to stop the sound device 31. This setpoint may be set in consideration of the volume of running and other sounds generated by the first mobile object. The controller 13 transmits, through the communication interface 11, the generated control signal to the sound device 31 via the network 2. When the sound device 31 receives a control signal from the information processing apparatus 10 via network 2, it lowers the volume to a set value or to zero or stops according to the received control signal.

For example, if the controller 13 identifies a second mobile object as a device that generates sound, it generates an instruction signal to instruct the second mobile object to switch the operation modes to the second mode. The controller 13 transmits, through the communication interface 11, the generated instruction signal to the second mobile object via the network 2. In the mobile object 20, the second mobile object, the controller 26 controls the communication interface 21 to receive the instruction signal from the information processing apparatus 10 via the network 2. The controller 26 switches the operation mode of the mobile object 20 to the second mode, for example, temporarily or for a predetermined period of time, according to the received instruction signal, and continues autonomous driving. The predetermined time may be set assuming the time it takes for the pedestrian 3 to notice the approach of the first mobile object after the first mobile object is detected. Here, if the sound generated from the second mobile object includes rotating sound of the motor 24, the second mode may be an operation mode in which the traveling speed of the mobile object 20 is slower than the first mode. When the traveling speed of the mobile object 20 is reduced to a lower speed, the number of rotations of the motor 24 is reduced, thereby reducing the sound generated by the motor 24. When the sound generated from the second mobile object includes sound output from the speaker 23, the second mode may be the operation mode in which the volume of the sound output from the speaker 23 is set to be less than in the first mode or to zero, or the output of the sound from the speaker 23 is stopped.

After the processing of step S5, the controller 13 returns to the processing of step S1. When steps S1-S5 are executed repeatedly, the controller 13 may terminate the processing of the information processing method as shown in FIG. 3 at any given time.

Thus, in the information processing apparatus 10, when the controller 13 detects a first mobile object traveling in the vicinity of the pedestrian 3, it identifies devices that generate sound within the surrounding area of the pedestrian 3 and controls the sound generated by the identified devices to be reduced. This configuration reduces the sound generated within the surrounding area of the pedestrian 3 when the first mobile object traveling in the vicinity of the pedestrian 3 is detected. By reducing the sound generated within the surrounding area of the pedestrian 3, the environmental noise or noise for the pedestrian 3 is reduced. This makes it easier for the pedestrians 3 to notice the sounds such as running noises emitted by the first mobile object. As a result, it is easier for the pedestrian 3 to notice the presence of the first mobile object traveling in his/her vicinity.

By the way, from the viewpoint of ensuring the safety of the pedestrians 3, it is conceivable to have the first mobile object traveling in the vicinity of the pedestrians 3 output an alarm sound. However, the noise level in the city may increase as a result of the alarm sound output. Higher noise levels in the city can increase the probability that the pedestrians 3 will not notice the approach of the mobile object 20. In contrast, in the present embodiment, the controller 13 identifies devices that generate sound within the surrounding area of the pedestrian 3, and controls the sound generated by the identified devices to be reduced. By controlling the sound generated by the equipment to be reduced, the noise level in the city can be lowered while the pedestrians 3 become more aware of the presence of the first mobile object traveling in the vicinity.

Thus, the present embodiment can provide improved technology for making the pedestrian 3 aware of the approach of the mobile object 20.

Furthermore, in the present embodiment, the controller 13 may detect the mobile object 20 that is traveling in the vicinity of the pedestrian 3 and that satisfies the predetermined conditions as the first mobile object. By setting the predetermined conditions appropriately, it is possible, for example, to avoid detecting the mobile object 20 such as small vehicles as the first mobile object. This configuration can, for example, inhibit the control of sound generated from equipment within the surrounding area of the pedestrian 3 to be reduced even when a mobile object 20, which is unlikely to injure the pedestrian 3 even if it comes into contact with the pedestrian 3, is traveling in the vicinity of the pedestrian 3. As a result, it is possible to avoid situations such as unnecessary harm to the purpose of equipment within the surrounding area of the pedestrian 3. For example, by turning down the volume of the sound device 31, it is possible to avoid a situation in which the sound from the sound device 31 prevents the store from advertising and promoting its products. By switching the operation mode of the second mobile object to the second mode, it is possible to avoid a situation where the second mobile object is a transport vehicle and is unable to carry the cargo to the destination by the specified time. In addition, by switching the operation mode of the second mobile object to the second mode, it is possible to avoid a situation where the second mobile object is an advertising vehicle and cannot advertise by using an advertising voice, etc.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, in the embodiment described above, the information processing apparatus 10 is assumed to be a server. However, the information processing apparatus 10 is not limited to a server. As another example, the information processing apparatus 10 may be a roadside machine installed at an intersection or the like.

Examples of some embodiments of the present disclosure are described below. However, it should be noted that the embodiments of the present disclosure are not limited to these examples.

[Appendix 1] An information processing apparatus comprising a controller configured to:

identify a device that generates sound within a surrounding area of a pedestrian upon detecting a first mobile object traveling in a vicinity of the pedestrian; and control the sound generated from the identified device to be reduced.

[Appendix 2] The information processing apparatus according to appendix 1, wherein the controller is configured to:

detect the first mobile object from among a plurality of mobile objects based on positional information for the pedestrian and positional information for the plurality of mobile objects; and identify a second mobile object from among the plurality of mobile objects as the device that generates the sound.

[Appendix 3] The information processing apparatus according to appendix 1 or 2, wherein each mobile object of the plurality of mobile objects has, as operation modes, a first mode in which the each mobile object drives autonomously and a second mode in which the each mobile object drives autonomously with less sound generated from the each mobile object while driving autonomously than in the first mode, and is capable of switching between the first mode and the second mode, the information processing apparatus further comprises a communication interface, and the controller is configured to transmit an instruction signal to instruct the second mobile object to switch the operation modes to the second mode using the communication interface.

[Appendix 4] The information processing apparatus according to any one of appendices 1 to 3, wherein sound generated from the second mobile object includes rotating sound of a driving motor, and the second mode is an operation mode in which traveling speed of the each mobile object is set to be lower than in the first mode.

[Appendix 5] The information processing apparatus according to any one of appendices 1 to 4, wherein the sound generated from the second mobile object includes sound output from a speaker of the second mobile object, and the second mode is an operation mode in which volume of the sound output from the speaker is set to be less than in the first mode or set to zero, or output of the sound from the speaker is stopped.

[Appendix 6] The information processing apparatus according to any one of appendices 1 to 5, wherein the controller is configured to detect a mobile object traveling in the vicinity of the pedestrian and satisfying a predetermined condition as the first mobile object.

[Appendix 7] The information processing apparatus according to any one of appendices 1 to 6, wherein the predetermined condition is a condition of being a mobile object that is likely to cause injury to the pedestrian when colliding with the pedestrian.

[Appendix 8] The information processing apparatus according to any one of appendices 1 to 7, wherein the predetermined condition is a condition of being a mobile object traveling on a sidewalk when the pedestrian is walking on the sidewalk.

[Appendix 9] The information processing apparatus according to any one of appendices 1 to 8, wherein the predetermined condition is a condition of being a mobile object traveling on a roadway when the pedestrian is about to cross the roadway.

[Appendix 10] A system comprising:

the information processing apparatus according to any one of appendices 1 to 9;

at least one mobile object; and the device.

[Appendix 11] An information processing method comprising:

identifying a device that generates sound within a surrounding area of a pedestrian upon detecting a first mobile object traveling in a vicinity of the pedestrian; and controlling the sound generated from the identified device to be reduced.

The invention claimed is:

1. An information processing apparatus, comprising a controller configured to:

identify a device that generates sound within a surrounding area of a pedestrian upon detecting a first mobile object traveling in a vicinity of the pedestrian;

control the sound generated from the identified device to be reduced;

detect the first mobile object from among a plurality of mobile objects based on positional information for the pedestrian and positional information for the plurality of mobile objects;

identify a second mobile object from among the plurality of mobile objects as the device that generates the sound, wherein each mobile object of the plurality of mobile objects has, as operation modes, a first mode in which the each mobile object drives autonomously and a second mode in which the each mobile object drives autonomously with less sound generated from the each mobile object while driving autonomously than in the first mode, and is capable of switching between the first mode and the second mode, the information processing apparatus further comprises a communication interface, the controller is further configured to transmit an instruction signal to instruct the second mobile object to switch the operation modes to the second mode using the communication interface, sound generated from the second mobile object includes rotating sound of a driving motor, and the second mode is an operation mode in which traveling speed of the each mobile object is set to be lower than in the first mode.

2. The information processing apparatus according to claim 1, wherein the sound generated from the second mobile object includes sound output from a speaker of the second mobile object, and the second mode is an operation mode in which volume of the sound output from the speaker is set to be less than in the first mode or set to zero, or output of the sound from the speaker is stopped.

* * * * *